Sept. 5, 1967 W. S. PARKER 3,339,907
MARINE FENDER UNIT
Filed June 23, 1966

United States Patent Office 3,339,907
Patented Sept. 5, 1967

3,339,907
MARINE FENDER UNIT
Wilfred Samuel Parker, Wombourne, England, assignor to Edge and Sons Limited, Shifnal, England
Filed June 23, 1966, Ser. No. 563,331
Claims priority, application Great Britain, Apr. 17, 1963, 15,157/63
1 Claim. (Cl. 267—1)

This invention is a continuation-in-part of application No. 359,103, dated Apr. 13, 1964.

This invention relates to improvements in the marine fender units for fitting between the heads of fender piles and the deck of a jetty or other dock installation.

Fender units which cannot withstand substantial deflections in directions other than normal to the berthing face wear very rapidly and are liable to suffer considerable damage under the action of large deflecting forces arising during the berthing of a large vessel.

Fender units are known which are capable of absorbing such large deflecting forces, but these units have not proved very durable under heavy wear. Frequently these units have had to be built in situ into the jetty or dock installation thus giving rise to high costs with the result that such units have proved very uneconomical.

An object of the invention is to provide a marine fender unit which will give a high energy absorption with a comparatively low resultant load, accommodate substantial forces in directions other than those normal to the berthing face, and will be comparatively easy and economical to install.

The invention consists in a marine fender unit for accommodating the impact of vessels when berthing; comprising a longitudinally extending tubular rubber element which is longitudinally and laterally, elastically yieldable, the length of the said tubular element is about one-and-a-half times its outside diameter, the internal diameter of the tubular element is about half the said outside diameter, and the wall thickness of the tubular element is about one quarter of the said outside diameter; two metal plates, one at each of the ends of the rubber elements, a flexible tie member within the rubber element and directly connected to the said metal plates to limit the longitudinal spacing of the said metal plates, and means for rigidly connecting the ends of the tie member to the said metal plates of the unit.

The tie member may be steel wire rope or high-tensile steel chain.

Preferably, the tie member is under initial strain in order to compress the tubular rubber element axially. The rubber and metal should be resistant to corrosion by sea-water.

In use, fender piles are spaced from a jetty by one or more fender units as described above. The fender units can be used as single units, or in series, or in parallel, or in a combined series/parallel build-up to accommodate the impact of vessels on berthing.

The invention will be further described with reference to the accompanying drawing, in which.

Figure 1:
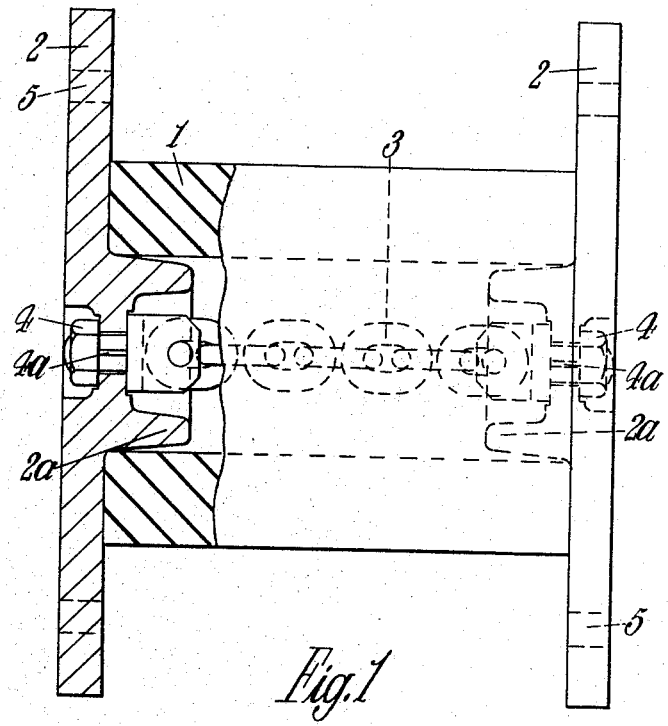
FIGURE 1 is an axial section through an embodiment of the fender unit.
Figure 2:
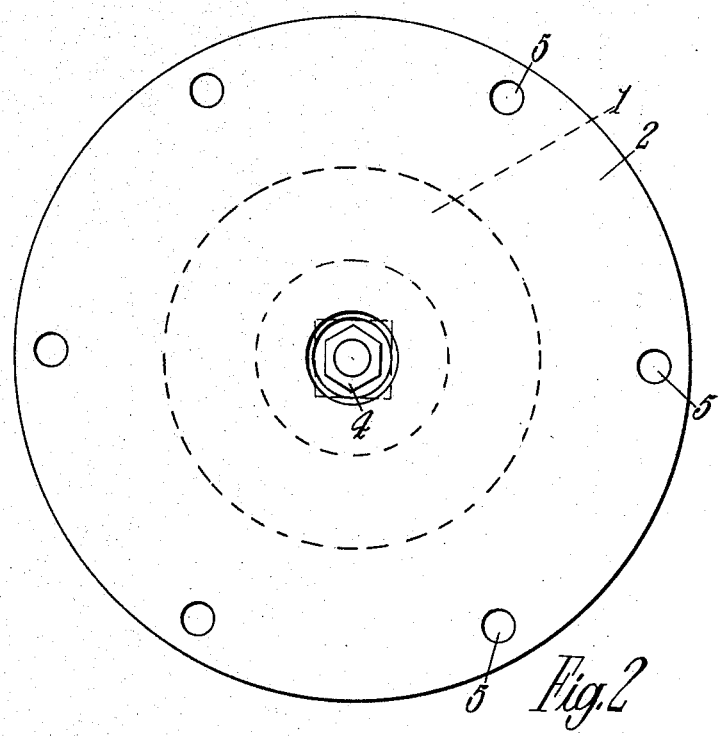
FIGURE 2 is an end view of the same unit.

The fender unit has a longitudinally extending heavy duty rubber tubular element 1. Preferably the rubber has the following properties:

(a) Ultimate tensile strength _____ 2,500 lbs. p.s.i. minimum.
(b) Heat ageing _____ 70 hrs. at 158° F.
    Tensile retention _____ 95% minimum.
    Elongation retention ___ 80% minimum.
    Hardness increase _____ +7 maximum.
(c) Tear resistance to B.S. 903.A3 _____ 250 lbs./in. (minimum).
(d) Shore hardness _____ 70±5.
(e) Compression set after 22 hours at 158° F. _____ 25%.
(f) Elongation _____ About 300%.

Metal end plates 2, with bosses 2a connected to each other by high-tensile steel chain 3 are arranged at each end of the tubular element 1. This chain binds the assembly together as a unit.

Moreover, it can act to compress the rubber tubular element 1 axially, so that a predetermined load can be obtained on initial set-up, if nuts 4 are tightened. Endplates 2 are provided with holes 5 whereby the fender unit may be attached at one end to a jetty and at the other end to the head of a fender pile spaced from the jetty.

In service, the fenders are liable to be loaded in three ways, direct axial compression, or lateral movement in either vertical or horizontal planes. In certain conditions of berthing, wind, and tide movements, a combination of all three types of loading may be experienced. Thus any unit which is only capable of axial movement would not be suitable for such an application.

When the loading of the unit is axial (compressional) the rubber distorts due to cold flow and the tie member 3 collapses. On removal of the load, the tie member is pulled back to its original position by the recovery properties of the rubber, and at the same time the unit is arrested in its equilibrium state by the same tie.

When a combined compressional thrust and lateral movement are applied to the fender pile, the unit absorbs the compressional forces by cold flow of the rubber and the lateral forces are restrained by tensional stress in the tie member 3. When the loading is removed, the rubber recovers under its natural cold flow tendencies and the predetermined initial compression takes effect to bring the unit back to its equilibrium position.

The outer circumference of the bosses 2a is tapered, as shown in FIGURE 1, in a direction away from the end plate 2. This tapering allows large deflections of the rubber element 1 without causing damage to the said element. Bosses 2a also help in keeping the rubber element 1 in position.

Keys 4a, on the shank of each nut 4, lie within corresponding grooves in the holes through which the nuts pass, and thus prevent the chain from twisting by immobilising the nut.

The unit of the invention is designed to undergo deflections of up to 50% under normal use, and higher deflections under extreme conditions. If the units are used behind suspended piles, a supplementary device may be required to help support the weight of the piles.

The unit will not be prone to corrosion through contact with sea-water as the rubber is sea-water resistant and the metal parts are designed and treated to be equally so. The proposed design has no mechanical moving parts which can be affected by the extremes of the elements to which dock fender units are subjected in service.

Various modifications may be made within the scope of the invention defined by the following claim.

I claim:

In a marine fender of the type using multiple resilient units for accommodating the impact of vessels when berthing; a unit comprising a longitudinally extending tubular rubber element which is longitudinally and laterally, elastically yieldable, the length of said tubular element being approximately one-and-a-half times its outside diameter, the internal diameter of the tubular element being approximately half the outside diameter, and the wall thickness of the tubular element being approximately one quarter of the outside diameter; two metal plates, one at each of the ends of the rubber element, a preloaded flexible tension member within the rubber element and directly connected to the metal plates to limit the spacing of the metal plates to compress the ends of said tubular element against said plates whereby upon misalignment of said metal plates when said fender receives the impact of a vessel said tubular element remains compressed against said plates over its entire surface.

References Cited

UNITED STATES PATENTS

| | | |
|---|---|---|
| 107,035 | 9/1870 | Gardiner. |
| 2,361,496 | 10/1944 | Pointer. |
| 2,655,005 | 10/1953 | Kinneman. |

FOREIGN PATENTS

| | | |
|---|---|---|
| 322,338 | 12/1929 | Great Britain. |

ARTHUR L. LA POINT, *Primary Examiner.*

R. M. WOHLFARTH, *Assistant Examiner.*